United States Patent
Chembula (10) Patent No.: US 9,576,175 B2
(45) Date of Patent: Feb. 21, 2017

(54) GENERATING EMOTICONS BASED ON AN IMAGE OF A FACE

(71) Applicant: Verizon Patent and Licensing Inc., Arlington, VA (US)

(72) Inventor: Ajay B. Chembula, Andhra Pradesh (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/279,468

(22) Filed: May 16, 2014

(65) Prior Publication Data
US 2015/0332088 A1    Nov. 19, 2015

(51) Int. Cl.
G06K 9/00 (2006.01)
G06K 9/46 (2006.01)
G06T 11/60 (2006.01)

(52) U.S. Cl.
CPC .............. *G06K 9/00* (2013.01); *G06K 9/00302* (2013.01); *G06K 9/46* (2013.01); *G06K 9/468* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 5,802,208 A * | 9/1998 | Podilchuk et al. | 382/224 |
| 8,254,639 B2 * | 8/2012 | Tsujimura | G03B 15/00 382/107 |
| 8,935,165 B2 * | 1/2015 | Huang et al. | 704/235 |
| 9,331,970 B2 * | 5/2016 | Yuen | H04L 51/10 |
| 2005/0085296 A1 * | 4/2005 | Gelb et al. | 463/31 |
| 2005/0163379 A1 * | 7/2005 | Zimmermann | G06Q 10/107 382/190 |
| 2007/0127844 A1 * | 6/2007 | Watanabe | G06T 13/40 382/276 |
| 2008/0278520 A1 * | 11/2008 | Andreasson | G09G 5/00 345/647 |
| 2009/0003709 A1 * | 1/2009 | Kaneda | G06K 9/4628 382/190 |

(Continued)

FOREIGN PATENT DOCUMENTS

| | | | |
|---|---|---|---|
| JP | 2002318649 A | * | 10/2002 |
| JP | 2008294724 A | * | 12/2008 |
| KR | 20140049340 A | * | 4/2014 |

OTHER PUBLICATIONS

Create Emoticons using your own facial expressions, Yi Chen, Feb. 18, 2012, pp. 1-7.*

(Continued)

*Primary Examiner* — Jayesh A Patel (57) ABSTRACT

A device is configured to receive an image of a person. The image may include an image of a face. The device may create an emoticon based on the image of the face. The emoticon may represent an emotion of the person. The device may detect a facial expression of the person at a time that a message is being generated. The device may determine the emotion of the person based on the detected facial expression. The device may identify the emoticon as corresponding to the emotion of the person. The device may add the emoticon to the message based on the emoticon corresponding to the emotion of the person. The device may output the message including the emoticon.

20 Claims, 9 Drawing Sheets

(56) References Cited

U.S. PATENT DOCUMENTS

| | | | | |
|---|---|---|---|---|
| 2009/0239203 A1* | 9/2009 | Lewis | G09B 19/00 | |
| | | | 434/236 | |
| 2010/0141662 A1* | 6/2010 | Storey | H04M 1/72544 | |
| | | | 345/473 | |
| 2010/0157099 A1* | 6/2010 | Nakai | H04N 5/23219 | |
| | | | 348/231.99 | |
| 2010/0177116 A1* | 7/2010 | Dahllof et al. | 345/619 | |
| 2010/0235451 A1* | 9/2010 | Yu | G06F 15/16 | |
| | | | 709/206 | |
| 2011/0047508 A1* | 2/2011 | Metzler | G06F 19/322 | |
| | | | 715/810 | |
| 2012/0059787 A1* | 3/2012 | Brown | G06F 17/241 | |
| | | | 706/52 | |
| 2012/0229248 A1* | 9/2012 | Parshionikar | G08B 21/06 | |
| | | | 340/3.1 | |
| 2013/0147933 A1* | 6/2013 | Kulas | H04N 21/41407 | |
| | | | 348/61 | |
| 2015/0149925 A1* | 5/2015 | Weksler | H04L 51/063 | |
| | | | 715/752 | |

OTHER PUBLICATIONS

Create Emoticons using your own facial expressions, Yi Chen, Feb. 18, 2102, pp. 1-7.*
Free App translates—Emoticon, Anthea Quay, Feb. 23, 2013, pp. 1-10.*
How fast—micro-Expressions, Yan et al., ResearchGate, 10.1007/s10919-013-0159-8, Dec. 2013, pp. 1-32.*
Wikipedia, "Emoticon", http://en.wikipedia.org/wiki/Emoticon, Apr. 18, 2014, 13 pages.

* cited by examiner

GENERATING EMOTICONS BASED ON AN IMAGE OF A FACE

BACKGROUND

An emoticon may be a pictorial representation of a facial expression used by people to express a person's emotion while electronically communicating. Generally, an emoticon may include punctuation marks, numbers, and/or letters to represent the facial expression. Sometimes, an emoticon may include a generic animated image (e.g., a cartoon image), such as a bright yellow smiley face.

DETAILED DESCRIPTION OF PREFERRED EMBODIMENTS

The following detailed description of example implementations refers to the accompanying drawings. The same reference numbers in different drawings may identify the same or similar elements.

Emoticons made of punctuation marks, numbers, letters, and/or generic animated images may not show a user's true emotions. A better way to show a user's true emotions when communicating may be for a user to use an emoticon derived from the user's own face. Moreover, a user may not always add an emoticon to a message that represents the user's true emotion. For example, a user may select a smiling emoticon even though the user is frowning and not happy. Accordingly, it may be beneficial to automatically select an emoticon that accurately represents a user's true emotion.

Implementations described herein may generate an emoticon based on an image of a user's face. Furthermore, implementations described herein may detect a user's facial expression and determine an emoticon to add to a message based on the detected facial expression.

Figure 1A:
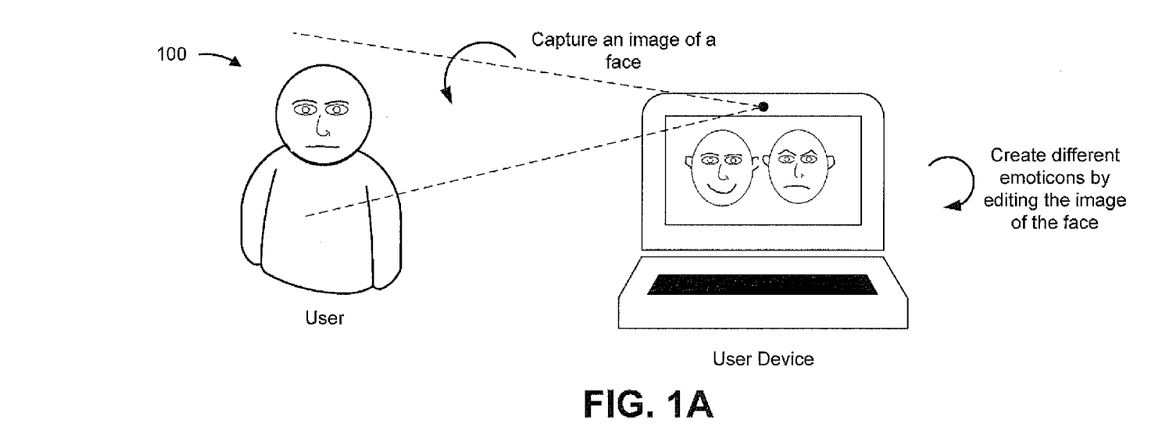
FIGS. 1A and 1B are diagrams of an overview of an example implementation described herein.

FIGS. 1A and 1B are diagrams of an overview of an example implementation 100 described herein. In FIG. 1A, assume a user inputs a request to create an emoticon into a user device. As shown in FIG. 1A, the user device may use a camera to capture an image of the user's face. Additionally, or alternatively, the user may provide a previously created image of the user's face to the user device. The user device may edit the image to create one or more emoticons. For example, the user device may isolate the user's face and remove any background images to create the emoticon. Additionally, or alternatively, the user device may add or change facial features in the image to create an emoticon from the image of the user's face. For example, the user device may use a graphics editing algorithm to add a smile to the user's face to create a smiling emoticon. The user device may provide the created emoticon to an emoticon palette used by a communication application used to send messages.

Figure 1B:
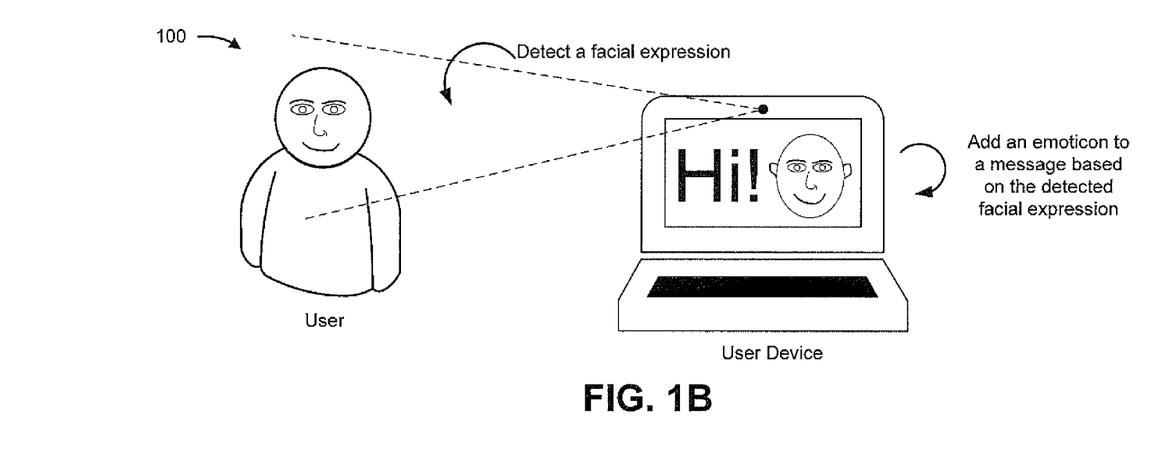

In FIG. 1B, assume a user is using the user device to send a message to another user using the communication application. Further, assume the user inputs a message into the user device, such as "Hi!" The user device may use a camera to capture an image of the user and detect a facial expression of the user while the user is inputting the message. The user device may determine an emoticon, created based on an image of the user's face, that corresponds to the detected facial expression and add the emoticon to the message. The user device may send the message, with the added emoticon, to the other user.

In this way, a user may use an emoticon that represents a user's true emotion to communicate. Moreover, the emoticon may represent an emotion that the user is truly feeling at the moment the message is sent.

Figure 2:
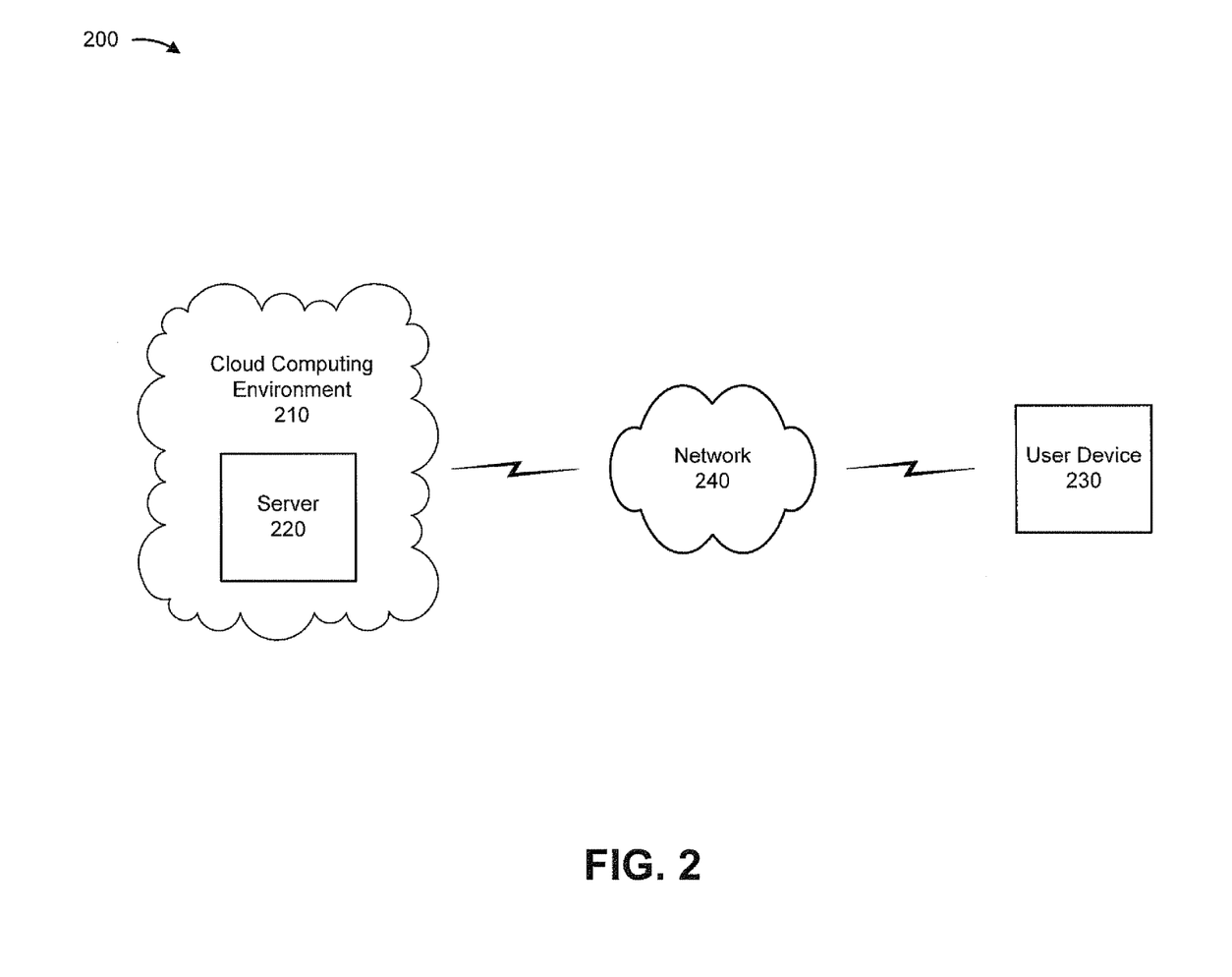
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a cloud computing environment 210, a server device 220, a user device 230, and/or a network 240. Devices of environment 200 may interconnect via wired connections, wireless connections, or a combination of wired and wireless connections.

Cloud computing environment 210 may include an environment that delivers computing as a service, whereby shared resources, services, etc. may be provided to user device 230. Cloud computing environment 210 may provide computation, software, data access, storage, and/or other services that do not require end-user knowledge of a physical location and configuration of a system and/or a device that delivers the services. As shown, cloud computing environment 210 may include server device 220.

Server device 220 may include one or more devices capable of storing, processing, and/or routing information. In some implementations, server device 220 may include a communication interface that allows server device 220 to receive information from and/or transmit information to other devices in environment 200.

User device 230 may include a device capable of receiving, processing, and providing information. For example, user device 230 may include a mobile phone (e.g., a smart phone, a radiotelephone, etc.), a computing device (e.g., a laptop computer, a tablet computer, a handheld computer, a gaming device, etc.), or a similar device. In some implementations, user device 230 may include a communication interface that allows user device 230 to receive information from and/or transmit information to another device in environment 200. In some implementations, user device 230 may include a camera for capturing an image of a user's face.

Network 240 may include one or more wired and/or wireless networks. For example, network 240 may include a cellular network, a public land mobile network (PLMN), a second generation (2G) network, a third generation (3G) network, a fourth generation (4G) network, a fifth generation (5G) network, a long term evolution (LTE) network, and/or a similar type of network. Additionally, or alternatively, network 240 may include a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a satellite network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
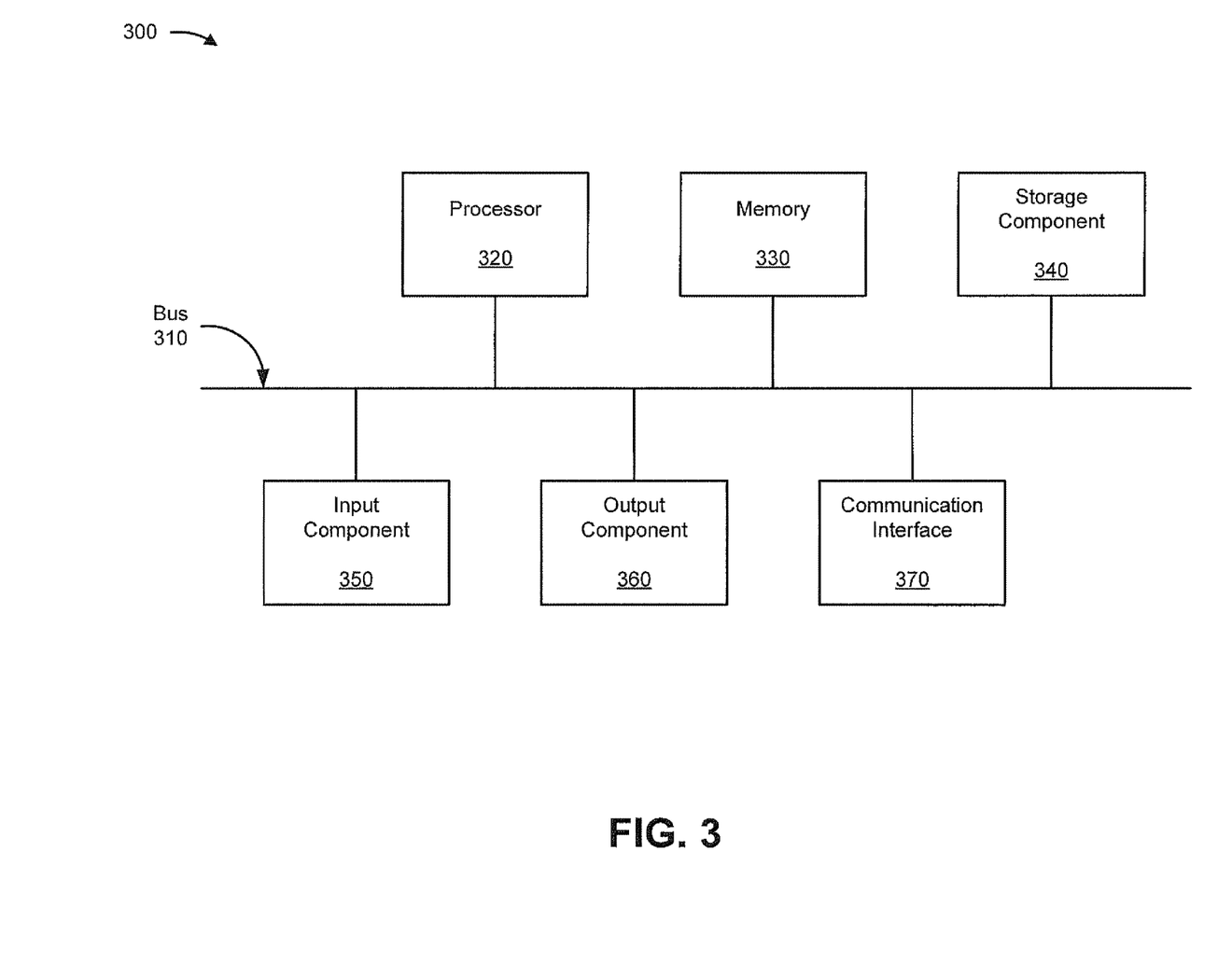
FIG. 3 is a diagram of example components of one or more devices of FIG. 2.

FIG. 3 is a diagram of example components of a device 300. Device 300 may correspond to server device 220 and/or user device 230. In some implementations, server device 220 and/or user device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a camera, a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
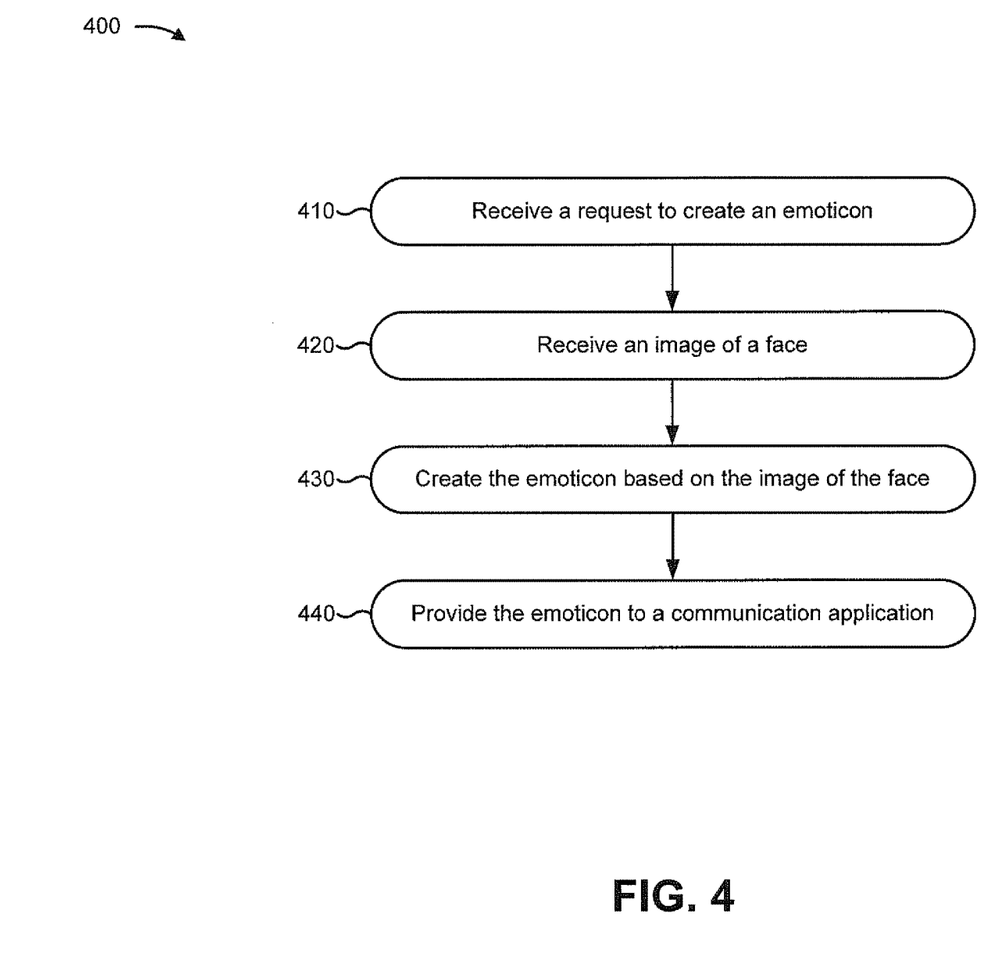
FIG. 4 is a flow chart of an example process for creating an emoticon based on an image of a face.

FIG. 4 is a flow chart of an example process 400 for creating an emoticon based on an image of a face. In some implementations, one or more process blocks of FIG. 4 may be performed by user device 230. In some implementations, one or more process blocks of FIG. 4 may be performed by another device or a group of devices separate from or including user device 230, such as cloud computing environment 210 and/or server device 220.

As shown in FIG. 4, process 400 may include receiving a request to create an emoticon (block 410). For example, user device 230 may receive a request to create the emoticon.

In some implementations, user device 230 may store an application (e.g., a computer program) for creating emoticons in a memory included in user device 230. A user of user device 230 may input a command into user device 230 to execute the application using an input component 360 associated with user device 230. User device 230 may execute the application and the user may input a request, to create an emoticon, into user device 230 using the application.

Additionally, or alternatively, server device 220 may receive the request to create the emoticon. For example, cloud computing environment 210 may be used to create the emoticon. In such a case, the user may input the request to create the emoticon into user device 230, and user device 230 may send the request to server device 220. Server device 220 may receive the request to generate the emoticon from user device 230.

As further shown in FIG. 4, process 400 may include receiving an image of a face (block 420). For example, user device 230 may receive the image of the face.

User device 230 may prompt the user to input an image that includes an image of the user's face based on the request to create the emoticon. For example, user device 230 may display an image prompting the user to input the image. In some implementations, user device 230 may prompt the user to input one or more images of particular facial expressions. For example, user device 230 may prompt the user to input an image of a smiling face, a frowning face, a straight face, a face with a tongue sticking out, a surprised face, an angry face, a happy face, a face with a mouth open, or the like.

In some implementations, the user may operate a camera to capture an image of the user's face. For example, the user may operate a camera included in or connected to user device 230 to capture the image and send the image to user device 230. Thus, user device 230 may receive the image from a camera. Additionally, or alternatively, the user may obtain a previously captured image and send the image to user device 230. For example, the user may transfer an image from another device (e.g., a smartphone, a memory stick, a computer, etc.) to user device 230. Thus, user device 230 may receive the image from another device and/or from a memory included in or connected to user device 230.

The user may input an image into user device 230 based on the image user device 230 prompted the user to input. For example, the user may input an image of a smiling faced based on user device 230 prompting the user to input a smiling face. User device 230 may receive the image data and store the image data in a memory included in user device 230 and/or a memory accessible by user device 230. User device 230 may store the image data so as to be associated with facial expression information identifying the facial expression that user device 230 prompted the user to input. For example, user device 230 may store an image of the face with information identifying a smiling face if user device 230 prompted the user to input an image of a smiling face.

In a case where cloud computing environment 210 is used to create the emoticon, server device 220 may cause user device 230 to prompt the user to input the image. Furthermore, user device 230 may send the image to server device 220, and server device 220 may receive the image from user device 230. Server device 220 may store the image to be associated with facial expression information, identifying a facial expression, in a memory included in server device 220 and/or a memory included cloud computing environment 210.

As further shown in FIG. 4, process 400 may include creating the emoticon based on the image of the face (block 430). For example, user device 230 may create the emoticon.

An emoticon may be image data that represents a facial expression or emotion of the user. The emoticon may be created by editing the image of the face, thereby creating a unique and personalized emoticon. The emoticon may be a real or non-animated image of the face (e.g., a photograph of a person) or may be an animated version of the face (e.g., a cartoon or a caricature of the person). An emoticon may include a smiling emoticon, a laughing emoticon, a winking emoticon, a frowning emoticon, an angry emoticon, a blushing emoticon, an embarrassing emoticon, a cheeky emoticon (e.g., with a tongue out), an oh moment emoticon, a crying emoticon, an agree emoticon, a disagree emoticon, and/or another kind of emoticon.

In some implementations, user device 230 may use facial recognition software to identify the face in the image. User device 230 may edit the image to remove everything or nearly everything other than the face from the image. For example, user device 230 may remove the background of the image and/or a person's body (e.g., neck, shoulders, torso, arms, legs, etc.) from the image. In some implementations, user device 230 may leave all or a part of the person's body and/or background in the image. User device 230 may store the edited image as an emoticon.

Additionally, or alternatively, user device 230 may edit the image by manipulating the face in the image. For example, user device 230 may change an expression on the face (e.g., a straight face to a smiling face), change a size and/or shape of a facial feature (e.g., enlarge the eyes in the image), change a color of all or part of the face (e.g., change an eye color or a hair color), add or remove facial hair, add or remove wrinkles, and/or perform any other manipulation of the face in the image. Additionally, or alternatively, user device 230 may edit the image by adding accessories to the image. For example, user device 230 may add a hat, an earring, a tattoo, a pair of glasses, etc. to the image. In some implementations, the manipulation of the face in the image may be user customizable. User device 230 may store the edited image as an emoticon.

In some implementations, user device 230 may create more than one emoticon from a single image of the face. For example, user device 230 may manipulate the image of the face in different ways and save an image for each different kind of manipulation as an emoticon. For instance, user device 230 may manipulate an image of a straight face (as identified by the associated facial expression information) to add a smile to the face. User device 230 may store the edited image as an emoticon (e.g., a smiling emoticon). Similarly, user device 230 may manipulate the image of the straight face to add an angry expression to the face (e.g., slant the eyebrows, add wrinkles to the forehead, add a frown to the face, etc.). User device 230 may store the edited image as a different emoticon (e.g., an angry emoticon). User device 230 may generate an emoticon identifier (ID) that identifies the kind of emoticon or the kind of facial expression represented by the emoticon based on the kind of manipulation performed on the image. For example, the emoticon ID may identify a smiling emoticon, an angry emoticon, etc. User device 230 may store the emoticon ID to be associated with the emoticon.

In some implementations, user device 230 may create a different emoticon based on each image. For example, user device 230 may prompt the user to smile, capture an image of the user smiling, and create a smiling emoticon based on the image of the user smiling. Likewise, user device 230 may prompt a user to frown, capture an image of the user frowning, and create a frowning emoticon based on the image of the user frowning. User device 230 may generate an emoticon ID for the emoticon based on the facial expression information associated with the image used to create the emoticon. For example, if the facial expression information indicates the image is of a smiling face, user device 230 may generate an emoticon ID that identifies a smiling emoticon for the emoticon that was generated based on the image of the smiling face.

Although user device 230 has been described as creating an emoticon, server device 220 may create the emoticon in a case where cloud computing environment 210 is used to create the emoticons. For example, server device 220 may create the emoticon based on the image received from user device 230. Furthermore, server device 220 may generate the emoticon ID for the emoticon and send the emoticon and the emoticon ID to user device 230. User device 230 may store the emoticon and the emoticon ID in a memory included in user device 230 and/or accessible by user device 230.

As further shown in FIG. 4, process 400 may include providing the emoticon to a communication application (block 440). For example, user device 230 may provide the emoticon to a communication application by importing the emoticon to an existing emoticon palette for the communication application. An emoticon palette may be a group of emoticons that the communication application may use. The communication application may be a web application, a mobile application, a desktop application, or the like used to communicate with other user devices 230. For example, the communication application may be a social network application, a chat application, an instant messaging application, a text messaging application, an email application, or a similar application used to send messages. In some implementations, user device 230 may provide the emoticon to other kinds of applications, such as a word processing application, a spreadsheet application, etc.

In some implementations, server device 220 may provide the emoticon to the communication application.

In some implementations, a user may be permitted to manipulate or customize any of the emoticons prior to providing the emoticons to the communication application.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
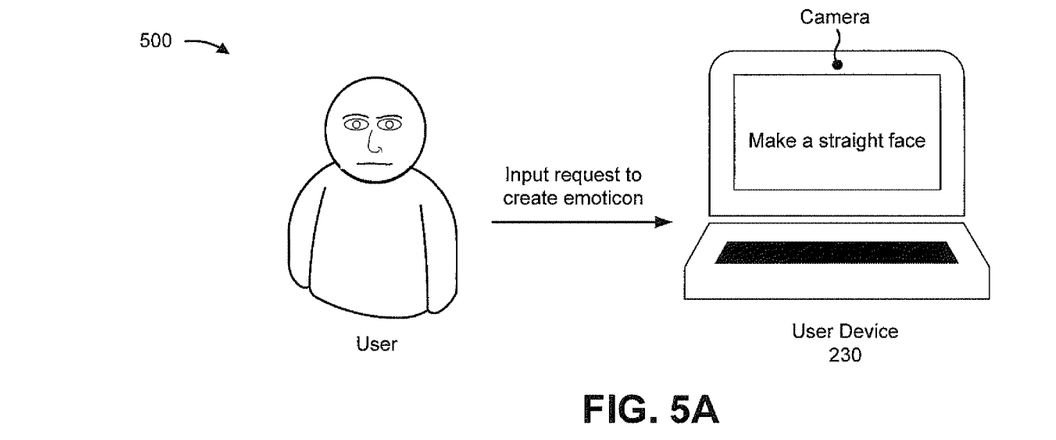
FIGS. 5A-5C are diagrams of an example implementation relating to the example process shown in FIG. 4.
Figure 5B:
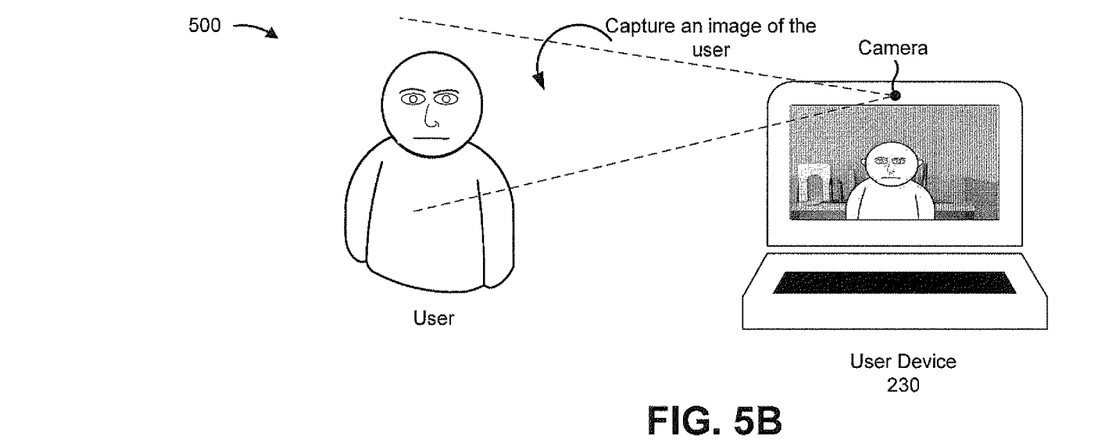
Figure 5C:
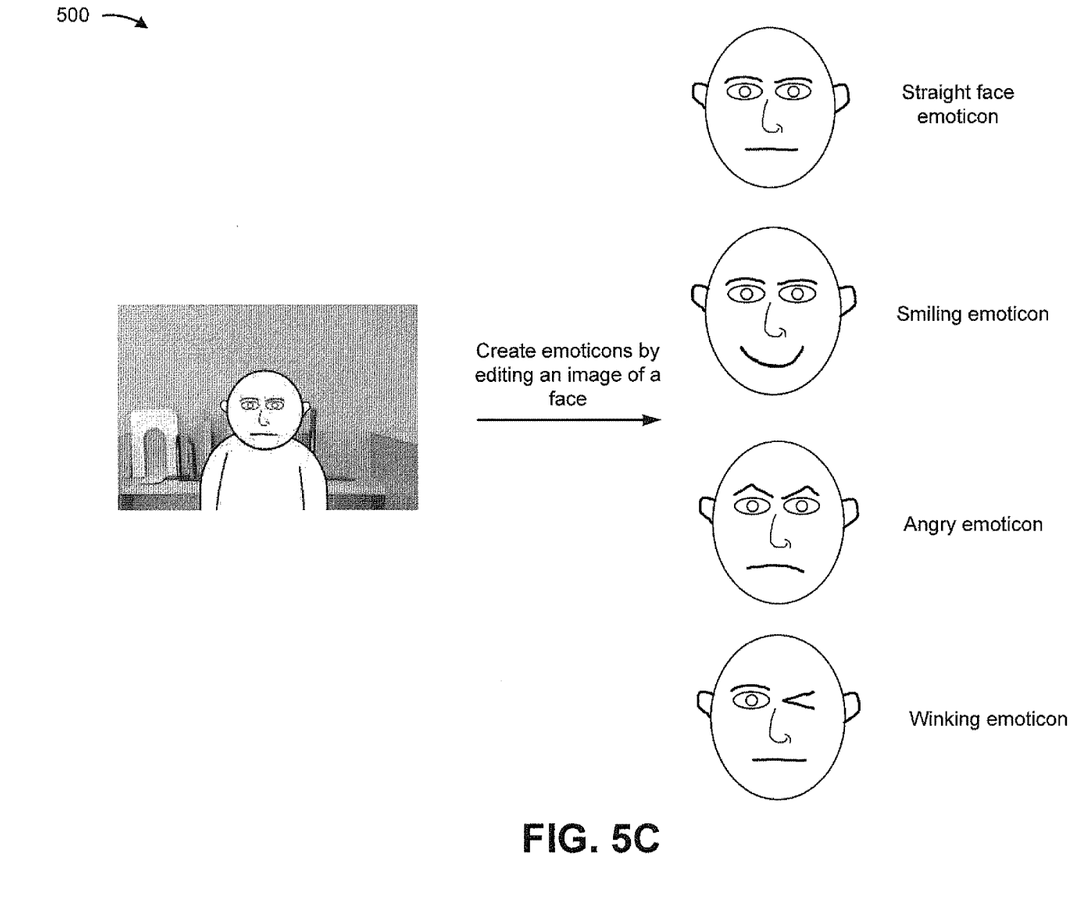

FIGS. 5A-5C are diagrams of an example implementation 500 relating to example process 400 shown in FIG. 4. FIGS. 5A-5C show an example of creating an emoticon based on an image of a face.

As shown in FIG. 5A, a user may input a request to create an emoticon into user device 230. User device 230 may receive the request and prompt the user to make a straight face by displaying an instruction to make a straight face.

As shown in FIG. 5B, the user may make a straight face as instructed by user device 230. User device 230 may use a camera included in user device 230 to capture an image of the user. As shown in FIG. 5B, the image of the user may include images of the user's face, the user's body, and a background image.

In FIG. 5C, assume user device 230 edits the image of the user to isolate the image of the user's face. For example, user device 230 may remove the image of the user's body and the background images from the image of the user. User device 230 may create multiple emoticons based on the image of the user's face.

For example, user device 230 may create a straight face emoticon based on the image of the user's face. Because the image of the user's face is already a straight face, user device 230 may merely store the image of the user's face as the straight face emoticon. User device 230 may store an emoticon ID associated with the straight face emoticon. The emoticon ID may indicate that the associated emoticon is a straight face emoticon.

Additionally, or alternatively, user device 230 may create a smiling emoticon based on the image of the user's face. For example, user device 230 may use a graphics editing algorithm to turn the mouth into a smile. User device 230 may store the edited image of the user's face as the smiling emoticon. User device 230 may store an emoticon ID associated with the smiling emoticon. The emoticon ID may indicate that the associated emoticon is a smiling emoticon.

Additionally, or alternatively, user device 230 may create an angry emoticon based on the image of the user's face. For example, user device 230 may use a graphics editing algorithm to turn the mouth into a frown and slant the eyebrows down. User device 230 may store the edited image of the user's face as the angry emoticon. User device 230 may store an emoticon ID associated with the angry emoticon. The emoticon ID may indicate that the associated emoticon is an angry emoticon.

Additionally, or alternatively, user device 230 may create a winking emoticon based on the image of the user's face. For example, user device 230 may use a graphics editing algorithm to close one eye. User device 230 may store the edited image of the user's face as the winking emoticon. User device 230 may store an emoticon ID associated with the winking emoticon. The emoticon ID may indicate that the associated emoticon is a winking emoticon.

User device 230 may add the straight face emoticon, the smiling emoticon, the angry emoticon, the winking emoticon, and the associated emoticon IDs to an emoticon palette for a communication application. In some implementations, the user may customize the straight face emoticon, the smiling emoticon, the angry emoticon, and/or the winking emoticon prior to adding the emoticons to the emoticon palette. Accordingly, the communication application may use the straight face emoticon, the smiling emoticon, the angry emoticon, and/or the winking emoticon when sending messages.

As indicated above, FIGS. 5A-5C are provided merely as an example. Other examples are possible and may differ from what was described with regard to FIGS. 5A-5C.

Figure 6:
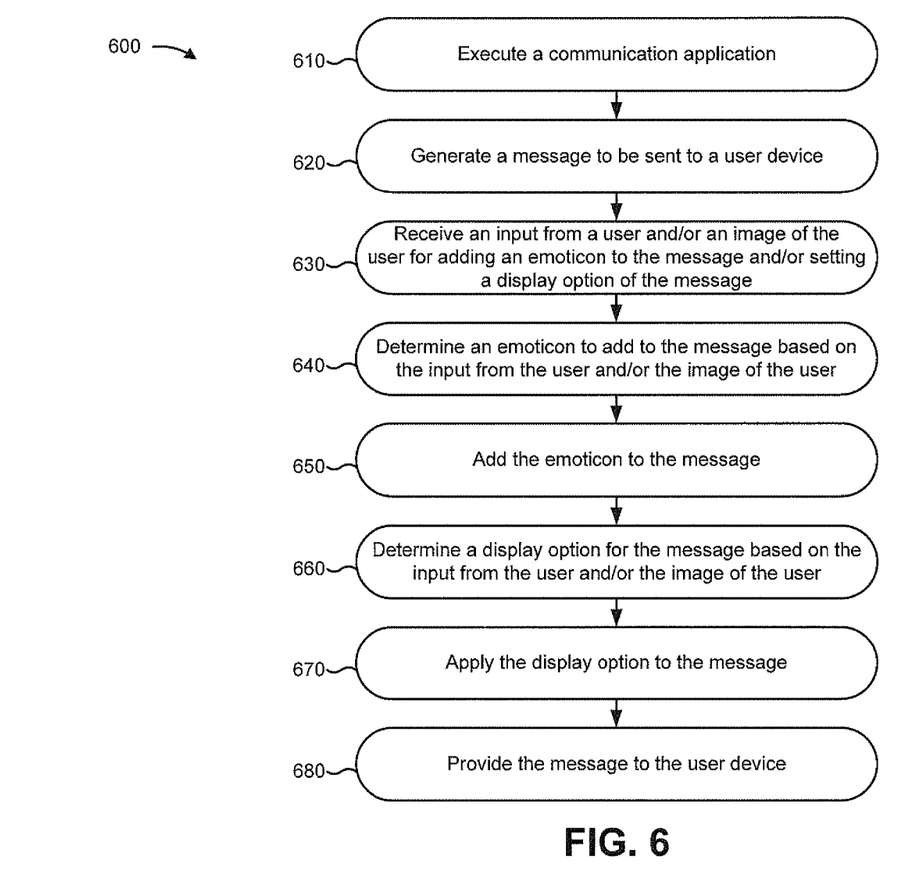
FIG. 6 is a flow chart of an example process for adding an emoticon to a message to be sent using a communication application.

FIG. 6 is a flow chart of an example process 600 for adding an emoticon to a message to be sent using a communication application. In some implementations, one or more process blocks of FIG. 6 may be performed by user device 230. In some implementations, one or more process blocks of FIG. 6 may be performed by another device or a group of devices separate from or including user device 230, such as cloud computing environment 210 and/or server device 220.

As shown in FIG. 6, process 600 may include executing a communication application (block 610). For example, user device 230 may execute the communication application based on an input from a user of user device 230. For instance, the communication application may be a social network application, a chat application, an instant messaging application, a text message application, an email application, or a similar application used to send messages.

As further shown in FIG. 6, process 600 may include generating a message to be sent to another user device 230 (block 620). For example, user device 230 may generate the message.

The message may be a text message, an instant message, a chat message, an email, or any other kind of message. The message may include text input by the user of user device 230 to be sent to another user device 230. User device 230 may generate the message based on the user inputting text or images, into user device 230, to be included in the message.

As further shown in FIG. 6, process 600 may include receiving an input from a user and/or an image of the user used for adding an emoticon to the message and/or for setting a display option of the message (block 630). For example, user device 230 may receive the input and/or the image of the user.

In some implementations, a user may use an input component 350 (e.g., a keyboard, a mouse, etc.) to input text and/or a selection. For example, user device 230 may display multiple emoticons for the user to select from and the user may select an emoticon to add to a message. Additionally, or alternatively, user device 230 may input characters (e.g., letters, numbers, symbols, characters, punctuation marks, etc.) associated with an emoticon. For example, a user may input ":)" to indicate a smiling emoticon should be added to the message. Likewise, the user may input a selection of a display option for the message (e.g., a background color, a font, etc.). User device 230 may receive the input from the user.

In some implementations, user device 230 may cause a camera to capture or record an image of a user while the communication application is executed. For example, the camera may capture or the record the image of the user at all times the communication application is executed, based on user input (e.g., when a user selects an "add emoticon" option), and/or when a message is being generated (e.g., automatically when a user is inputting text for a message). The camera may generate the image and user device 230 may obtain the image from the camera.

As further shown in FIG. 6, process 600 may include determining an emoticon to add to a message based on the input from the user and/or the image of the user (block 640). For example, user device 230 may determine the emoticon to add to the message.

In some implementations, user device 230 may determine the emoticon to add to the message based on the input from the user. For example, user device 230 may determine an emoticon associated with characters input by the user should be added to the message. For instance, the characters input by the user may be associated with an emoticon ID, and user device 230 may obtain an emoticon from the emoticon palette that is associated with the emoticon ID. Additionally, or alternatively, user device 230 may determine an emoticon, selected by the user from among the displayed emoticons, to be added to the message.

In some implementations, user device 230 may determine the emoticon to add to the message without user input. For example, user device 230 may detect a facial expression of the user at a particular time, identify an emotion based on the facial expression, and determine the emoticon to add to the message based on the emotion. For example, user device 230 may detect a facial expression to automatically determine an emoticon to add to a message when a user selects an "add emoticon" option and/or when a message is being generated (e.g., automatically when a user is inputting text for a message). At what time user device 230 determines the emoticon to add to the message may be a preference set by a user.

In some implementations user device 230 may identify a face in the image of the user and detect a facial expression of the face based on a configuration of facial features. For example, user device 230 may detect a facial expression based on a shape of a mouth and/or lips, whether teeth are showing, whether a tongue is showing, a shape and/or direction of eyebrows, a shape and/or size of eyes, a shape and/or size of nostrils, an amount and location of wrinkles, etc. For instance, user device 230 may identify a smiling facial expression based on detecting the lips are curved up and/or teeth are showing. Accordingly, user device 230 may identify a happy emotion. On the other hand, user device 230 may identify an angry facial expression based on detecting the lips are curved down, no teeth are showing, and/or the eyebrows are slanted down. Accordingly, user device 230 may identify an angry emotion. Each facial expression and/or emotion may be associated with an emoticon ID, and user device 230 may obtain an emoticon from the emoticon palette that is associated with the emoticon ID.

In some implementations, user device 230 may prompt the user to change facial expressions to a facial expression that the user desires to be represented by an emoticon. User device 230 may detect the facial expression and automatically identify an emoticon to add to the message based on the detected facial expression. Additionally, or alternatively, user device 230 may monitor the user's facial expressions for a period of time (e.g., while the user is inputting text for the message) and use a most prevalent facial expression during the period of time to automatically identify the emoticon to add to the message. A most prevalent facial expression may be a facial expression that is detected for the longest time during the period of time, and/or a facial expression detected with a highest level of confidence. A level of confidence may represent how closely a detected facial expression matches a facial expression known to user device 230.

In some implementations, user device 230 may detect multiple facial expressions. In such a case, user device 230 may use a facial expression having a highest level of confidence to identify an emoticon to add to a message. If none of the detected facial expressions have a level of confidence that satisfies a threshold level, user device 230 may present emoticons associated with the facial expressions to the user to select an emoticon to add to the message. Additionally, or alternatively, user device 230 may determine that multiple emoticons associated with the multiple facial expressions are to be added to the message.

Additionally, or alternatively, user device 230 may determine the emoticon to add to the message based on a sound recorded by a microphone included in or accessible by user device 230. In other words, user device 230 may determine an emotion based on the recorded sound. For example, user device 230 may detect a laugh, a scream, a certain word, etc. that may indicate a user's emotion. For instance, user device 230 may determine a happy emoticon based on detecting a laugh or a certain word (e.g., "funny"), or an angry emoticon based on detecting a scream or a certain word (e.g., "mad"). Each sound may be associated with an emoticon ID, and user device 230 may obtain an emoticon from the emoticon palette that is associated with the emoticon ID.

In some implementations, user device 230 may monitor sounds for a period of time (e.g., while the user is inputting text for the message) and use a most prevalent sound during the period of time to automatically identify the emoticon to add to the message. A most prevalent sound may be sound that is detected for the longest time during the period of time, a sound detected with a highest level of confidence, and/or a loudest sound during the period of time. A level of confidence may represent how closely a detected sound matches a sound known to user device 230.

In some implementations, user device 230 may detect multiple sounds. In such a case, user device 230 may use a sound having a highest level of confidence to identify an emoticon to add to a message. If none of the detected sounds have a level of confidence that satisfies a threshold level, user device 230 may present emoticons associated with the sounds to the user to select an emoticon to add to the message. Additionally, or alternatively, user device 230 may determine that multiple emoticons associated with the sounds are to be added to the message.

User device 230 may determine the emoticon to add to the message based on the image of the user (e.g., a detected facial expression) and/or a recorded sound at a time indicated by a user (e.g., at a time a user inputs a request to add an emoticon to a message), when a message is being input by a user, and/or when user device 230 detects a change in a facial feature of the user and/or a change in a sound. In some implementations, user device 230 may determine the emoticon to add to the message based on a combination of the image of the user and the recorded sound. For example, if user device 230 is not able to determine an emoticon to add to the message based on the image of the user (e.g., user device 230 is not able to detect a facial expression and/or detect a facial expression with a threshold level of confidence) then user device 230 may use a combination of the image of the user and the recorded sound to determine an emoticon to add to the message.

In some implementations, rather than selecting a pre-created emoticon based on the image of the user, user device 230 may automatically create an emoticon in real time, without user input, based on the image data received while the message is being generated. For example, user device 230 may perform process 400 while text for messages is being input by a user. In this way, an emoticon that accurately reflects the user's facial expression at the time the message is generated may be added to the message.

As further shown in FIG. 6, process 600 may include adding the emoticon to the message (block 650). For example, user device 230 may add the emoticon to the message by including the emoticon in the message such that the emoticon will be displayed on the other user device 230 when the message is sent to the other user device 230.

As further shown in FIG. 6, process 600 may include determining a display option for the message based on the input from the user and/or the image of the user (block 660). For example, user device 230 may determine a display option for the message based on the input from the user, the facial expression identified in the image of the user, and/or the emotion identified in the recorded sound.

A display option for the message may include a color, a font, a size, an emphasis, etc. of the text in the message. Additionally, or alternatively, the display option may include a color and/or pattern of a background of the message (e.g., a window in which the message is displayed on user device 230 and/or on the other user device 230 to which the message is sent).

In some implementations, user device 230 may select a display option based on the facial expression in the image and/or the emotion identified in the recorded sound. For example, user device 230 may select a red background and/or bold text when an angry facial expression (e.g., based on detecting a frown in the image) or an unhappy emotion (e.g., based on detecting a scream) is detected. Additionally, or alternatively, user device 230 may select a yellow background and/or green text when a smiling facial expression (e.g., based on detecting a smile in the image) or a happy emotion (e.g., based on detecting a laugh) is detected.

As further shown in FIG. 6, process 600 may include applying the display option to the message (block 670). For example, user device 230 may apply the display option to the message by setting a color, a font, a size, an emphasis, etc. of the text in the message and/or setting a color and/or pattern of a background of the message based on the display option determined at block 660.

In some implementations, user device 230 may automatically apply the display option without user input. For example, a user may set a permission or preference allowing display options to be automatically applied to messages based on detected facial expressions. On the other hand, user device 230 may ask a user whether the display option should be applied to the message before user device 230 applies the display option to the message.

As further shown in FIG. 6, process 600 may include providing the message to the other user device 230 (block 680). For example, user device 230 may provide the message to the other user device 230 via network 240. In some implementations, user device 230 may provide the message based on an instruction input from the user to send the message. The other user device 230 may receive the message and display the message including the emoticon and/or display the message with the display option.

In some implementations, one or more blocks 610-680 may be performed by server device 220 instead of or in addition to user device 230 regardless of whether the communication application is executed on user device 230 or server device 220.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
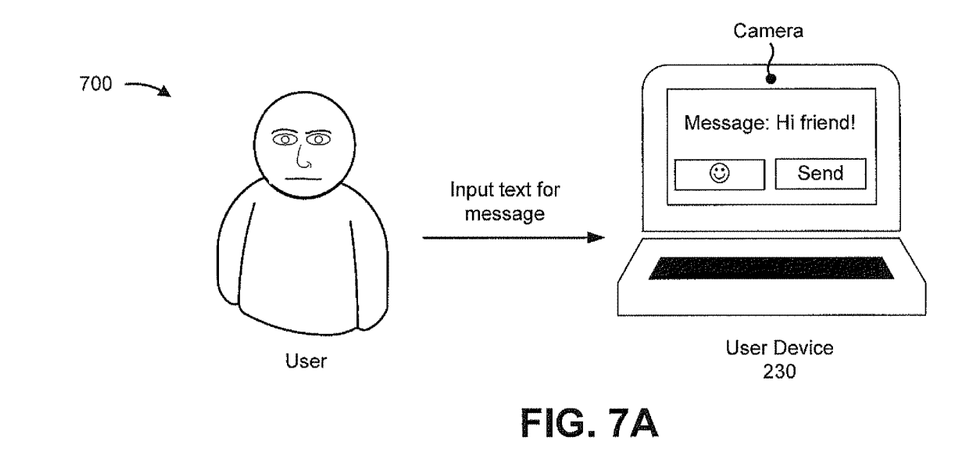
FIGS. 7A-7C are diagrams of an example implementation relating to the example process shown in FIG. 6.
Figure 7B:
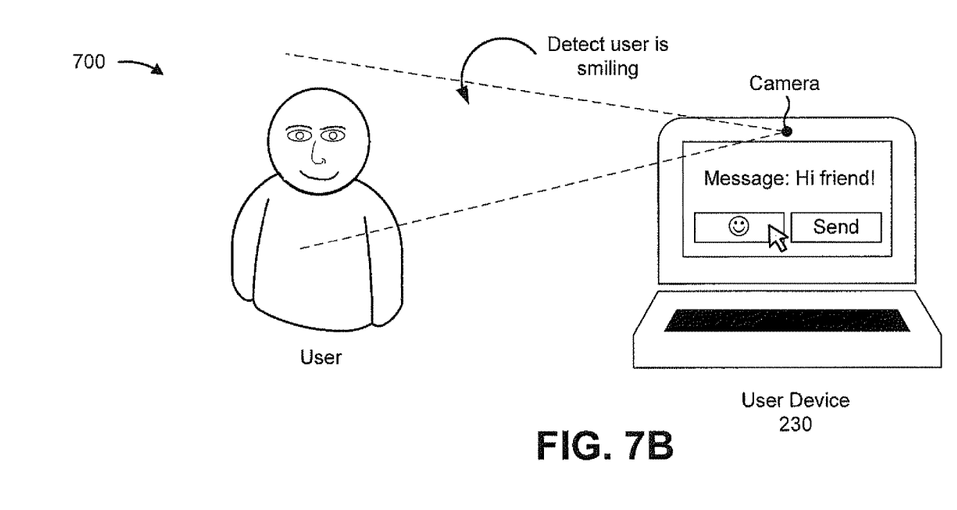
Figure 7C:
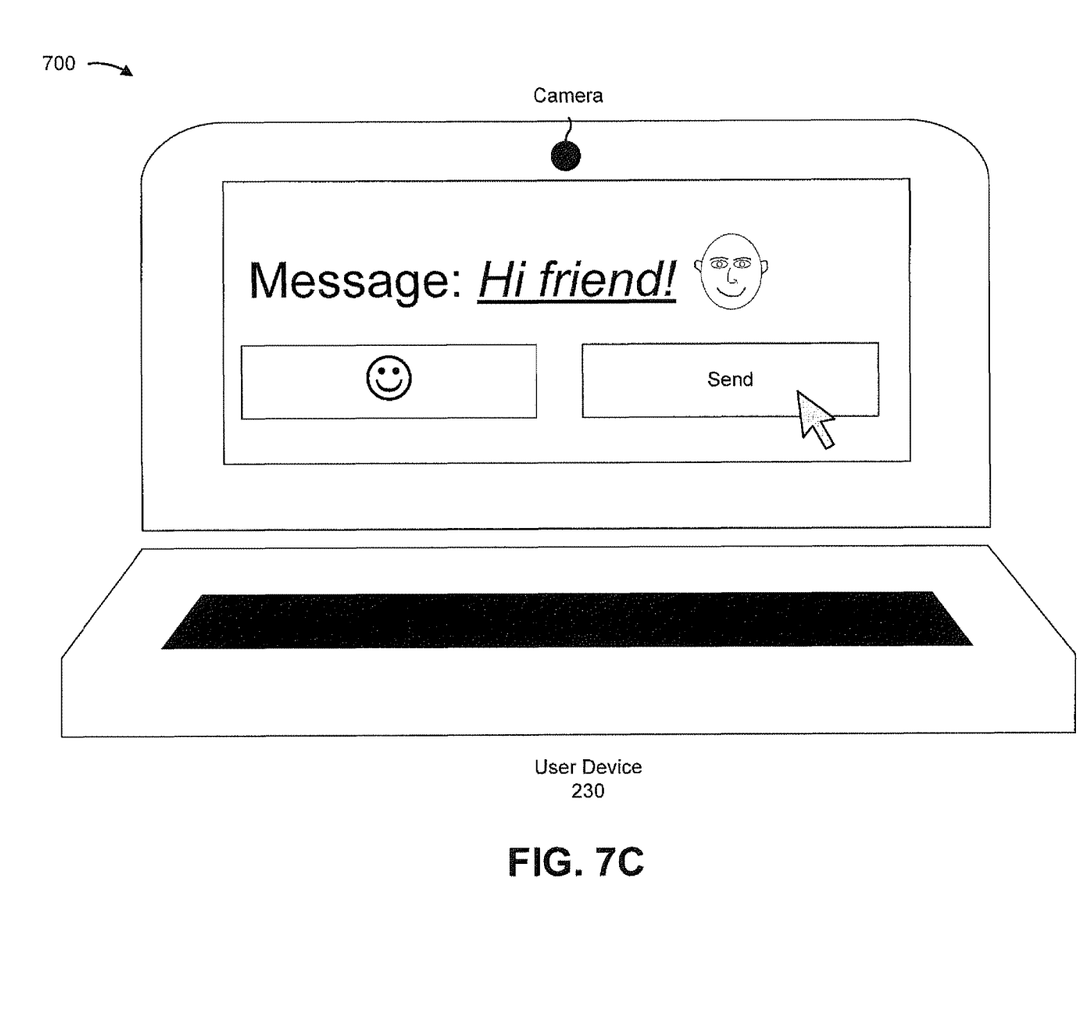

FIGS. 7A-7C are diagrams of an example implementation 700 relating to example process 600 shown in FIG. 6. FIGS. 7A-7C show an example of adding an emoticon to a message to be sent using a communication application.

In FIG. 7A, assume a user is executing a communication application on user device 230. As shown in FIG. 7A, the user may input text for a message to be sent to another user using the communication application. For example, the user may input "Hi friend!" into user device 230 and user device 230 may create a message based on the user input.

In FIG. 7B, assume a user selects an add emoticon button (e.g., the button with the smiley face in FIG. 7B). User device 230 may use a camera to capture an image of the user based on the add emoticon button being selected. Assume the user is smiling at the time the camera captures the image and that user device 230 detects that the user is smiling from the captured image. For example, user device 230 may determine that the corners of the mouth are curled upward indicating a smile. Accordingly, user device 230 may identify an emotion as happy.

In FIG. 7C, assume user device 230 searches an emoticon palette for the communication application for an emoticon ID indicating a smiling emoticon based on the smile being detected in the image and/or the happy emotion being identified. As shown in FIG. 7C, user device 230 may obtain the smiling emoticon associated with the emoticon ID and add the smiling emoticon to the message. Moreover, user device 230 may determine a display option should be changed based on the user smiling. For example, user device 230 may italicize and underline the text of the message to further emphasize the user's emotion. The user may select the send button and user device 230 may send the message to the other user.

As indicated above, FIGS. 7A-7C are provided merely as an example. Other examples are possible and may differ from what was described with regard to FIGS. 7A-7C.

Implementations described herein may generate an emoticon based on an image of a user's face. Furthermore, implementations described herein may detect a user's facial expression and determine an emoticon to add to a message based on the detected facial expression. Accordingly, a user's true emotion may be expressed in a message to another user.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
  one or more processors to:
    receive an image of a person,
      the image including an image of a face,
        the image of the face including an expression of the person;
    manipulate the image of the face to generate a plurality of facial images that depict different emotions of the person;
    create a plurality of emoticons based on the image of the face and based on the plurality of facial images,
      the created plurality of emoticons representing the different emotions of the person, and
      each of the created plurality of emoticons being different from other emoticons of the created plurality of emoticons;
    monitor facial expressions of the person during a period of time that a message is being generated by the person;
    determine a particular facial expression, of the facial expressions, that is detected for a longest time during the period of time and with a highest level of confidence;
    determine an emotion of the person based on the particular facial expression;
    identify an emoticon, from the created plurality of emoticons, as corresponding to the emotion of the person;
    add the emoticon to the message based on the emoticon corresponding to the emotion of the person; and
    output the message including the emoticon.

2. The device of claim 1, where the one or more processors are further to:
  prompt the person to input an image with the expression of the person; and
  receive the image of the person based on prompting the person to input the image with the expression of the person.

3. The device of claim 1, where the one or more processors are further to:
  cause a camera to capture the image of the person; and
  receive the image of the person from the camera.

4. The device of claim 1, where the one or more processors are further to:
  edit the image of the person to isolate the image of the face and remove a background image included in the image of the person.

5. The device of claim 1, where the one or more processors are further to:
  change a size and a shape of a facial feature of the image of the face, and
  change a color of the image of the face.

6. The device of claim 1, where the one or more processors are further to:
  receive a plurality of images of the person with different facial expressions,
    the plurality of images of the person including the image of the person; and
  create another plurality of emoticons corresponding to the plurality of images of the person, each of the other created plurality of emoticons being associated with a different facial expression of the different facial expressions.

7. The device of claim 1, where the one or more processors are further to:
manipulate the image of the face by at least one of changing an expression on the face, changing a size of a facial feature, changing a shape of a facial feature, or changing a color of a facial feature; and
create an image, for each different manipulation of the image of the face, as one of the created plurality of emoticons.

8. A non-transitory computer-readable medium storing instructions that,
when executed by one or more processors, cause the one or more processors to:
receive an image of a user, the image including an image of a face, the image of the face including an expression of the user;
manipulate the image of the face to generate a plurality of facial images that depict different emotions of the user;
automatically edit the image of the user to isolate the image of the face;
automatically create a plurality of emoticons based on the image of the face and based on the plurality of facial images, the created plurality of emoticons representing the different emotions of the user, and each of the created plurality of emoticons being different from other emoticons of the created plurality of emoticons;
provide the created plurality of emoticons to a communication application to permit the user to insert one or more of the created plurality of emoticons into a message being generated by the user;
monitor facial expressions of the user during a period of time that the message is being generated by the user;
determine a particular facial expression, of the facial expressions, that is detected for a longest time during the period of time and with a highest level of confidence;
determine an emotion of the user based on the particular facial expression;
identify an emoticon, from the created plurality of emoticons, as corresponding to the emotion of the user;
add the emoticon to the message based on the emoticon corresponding to the emotion of the user; and
output the message including the emoticon.

9. The non-transitory computer-readable medium of claim 8, where the instructions, when executed by the one or more processors, further cause the one or more processors to:
prompt the user to input a particular image with the expression of the user; and
receive the image of the user based on prompting the user to input the particular image with the expression of the user.

10. The non-transitory computer-readable medium of claim 8, where the instructions, when executed by the one or more processors, further cause the one or more processors to:
perform different kinds of manipulation to the image of the face to create the plurality of emoticons;
generate a respective emoticon identifier, for each of the created plurality of emoticons, identifying a kind of emoticon based on a kind of manipulation performed, the kind of manipulation being included in the different kinds of manipulation;
associate each of the created plurality of emoticons and the respective emoticon identifiers; and
provide the created plurality of emoticons and the respective emoticon identifiers to the communication application.

11. The non-transitory computer-readable medium of claim 8, where the instructions, when executed by the one or more processors, further cause the one or more processors to:
input the created plurality of emoticons to an emoticon palette associated with the communication application.

12. The non-transitory computer-readable medium of claim 8, where at least one of the created plurality of emoticons includes a photograph of the face of the user.

13. A method, comprising:
receiving, by a first device, an image of a user,
the image including an image of a face,
the image of the face including an expression of the user;
manipulating, by the first device, the image of the face to generate a plurality of facial images that depict different emotions of the user;
creating, by the first device, a plurality of emoticons based on the image of the face and based on the plurality of facial images,
the created plurality of emoticons representing the different emotions of the user, and
each of the created plurality of emoticons being different from other emoticons of the created plurality of emoticons;
receiving, by the first device, an input for generating a message to be sent to a second device;
monitoring, by the first device, facial expressions of the user during a period of time that the input is being received;
determining, by the first device, a particular facial expression, of the facial expressions, that is detected for a longest time during the period of time and with a highest level of confidence;
identifying, by the first device, an emotion of the user based on the particular facial expression;
determining, by the first device, an emoticon, of the created plurality of emoticons, to add to the message based on the emotion of the user;
adding, by the first device, the emoticon to the message; and
outputting, by the first device, the message, with the emoticon, for transmission to the second device.

14. The method of claim 13, further comprising: changing a size and a shape of a facial feature of the image of the face; and changing a color of the image of the face.

15. The method of claim 13, further comprising:
causing a camera to capture the image of the user; and
receiving the image of the user from the camera.

16. The method of claim 13, further comprising:
detecting a change in the particular facial expression; and
adding the emoticon to the message based on detecting the change in the particular facial expression.

17. The method of claim 13, further comprising:
detecting a sound made by the user; and
identifying the emotion of the user based on the sound and the particular facial expression.

18. The method of claim 13, further comprising:
determining another particular facial expression of the facial expressions; and identifying the emotion of the user based on the other particular facial expression.

19. The method of claim 13, further comprising:
changing a display option of the message based on the emotion of the user.

20. The method of claim 13, where the message includes at least one of text or a background image, and the method comprises at least one of:
changing a color of the text,
changing a font of the text based on the emotion of the user,
changing a size of the text based on the emotion of the user,
changing an emphasis of the text based on the emotion of the user,
changing a color of the background image based on the emotion of the user, or
changing a pattern of the background image based on the emotion of the user.

\* \* \* \* \*